Patented Aug. 9, 1932

1,870,452

UNITED STATES PATENT OFFICE

GUSTAF HAGLUND, OF STOCKHOLM, SWEDEN, ASSIGNOR TO PATENTAKTIEBOLAGET GRONDAL-RAMEN, OF STOCKHOLM, SWEDEN

PROCESS FOR REDUCING THE CONTENTS OF RESINS AND FATTY ACIDS IN CELLULOSE PRODUCED BY MEANS OF SULPHITE DIGESTION

No Drawing. Application filed April 10, 1931, Serial No. 529,301, and in Germany November 18, 1930.

In the manufacture of cellulose by the sulphite digestion process the cellulose produced generally contains more or less resins, and particularly if it is obtained from wood rich in resins. The same is likewise true as regards fatty acids.

I have found that this is occasioned by influences to which the contents of the digester are usually exposed after the sulphite digestion process, and by the fact that the chemical and other effects of the digestion process upon the resins and fatty acids from the wood is not such as to leave them in the waste liquor in a form which will resist their precipitation from the liquor when subjected to said influences.

During the digestion operation the resins and fatty acids are taken up in great part by the cooking liquor, most probably in a state of emulsification or colloidal suspension, and when the digestion is finished the cellulose is practically free from these substances as long as it remains in the digester and is subject to the conditions prevailing therein. However, when the digester is emptied and the cellulose along with the waste liquor is discharged into tanks in accordance with the usual practice, the liquor is cooled, and the resins and fatty acids, theretofore retained in the liquor in an emulsified, colloidally suspended or some other form, proceed to precipitate and deposit on the cellulose. Moreover, when the cellulose is afterwards subjected to the usual washing with water to remove the liquor therefrom, the capacity of the liquor to retain the resins and fatty acids is still further reduced, due on the one hand to the dilution attendant upon the washing and on the other hand to the lower temperature, and these substances are thereupon deposited on the cellulose to a further extent. As a consequence, the cellulose subjected to the usual treatment is contaminated with substantial quantities of resins and fatty acids, although during the digestion it was practically free from these substances.

In accordance with my invention, this contamination of the product is overcome and a high grade cellulose is obtained by separating the cellulose from a major or suitably large part of the waste liquor in the cellulose-waste liquor mixture resulting from the digestion before the period of contact of the liquor with the cellulose is prolonged, the temperature of the liquor is reduced and/or the liquor has been diluted, to such an extent that the resins and fatty acids are caused to precipitate appreciably.

The advantageous results obtainable by such procedure can be demonstrated as follows:—A suitable portion of the contents of the digester after completion of the digestion, is directly discharged from the digester against a screen in such a manner that the cellulose is retained by the screen and the waste liquor passes on through, thus effecting a prompt separation of the two materials while the liquor is still at the temperature and of the dilution characterizing it in the digester. The cellulose so obtained is washed with water to free it from residual liquor and is analyzed for resin.

A similar portion of the contents of the digester is then discharged into a tank, washed with water to free the cellulose from the liquor, and then analyzed for resin. The results of the two analyses will disclose that the resin in the cellulose from the first treatment, in which the greater part of the waste liquor was separated from the cellulose while still hot and undiluted, is considerably less than the resin in the cellulose from the second treatment, in which the waste liquor was not removed until cooling and dilution of the liquor while in contact wth the cellulose, had taken place. In one illustrative set of analyses, only 0.2–0.8% resin was shown to be present in the cellulose subjected to the first treatment, whereas the cellulose subjected to the second treatment, evidenced an increase of the resin content to 1–2.5%. As has been noted, however, these figures are simply illustrative, and the difference in resin contents between the cellulose treated in the two manners noted may be greater or less, depending upon the resin content of the crude material used and upon the extent to which the digestion of the material has been carried out.

A similar comparison of the fatty acid content of cellulose from the two treatments noted also evidences an appreciably increased fatty acid content in the cellulose which was in contact with the cooled and diluted liquor, over the fatty acid content of the cellulose which was separated from the liquor before the influence of those factors had a suitable opportunity to make themselves felt.

In the practical application of the process of my invention the hot contents of the digester are discharged into a suitable separating device wherein the cellulose and liquor are separated before any material cooling or dilution of the liquor takes place. The separating device may consist of a cellulose screw-press, a centrifugal separator, a suitable screen separator, or any other similar apparatus which will satisfactorily separate the cellulose from the liquor.

The separating device may if desired be connected directly with the digester so that upon discharge of the contents of the latter, the cellulose will be practically immediately separated from the waste liquor, thereby eliminating any practical possibility of the temperature of the liquor falling to such a point before separation that the capacity of the liquor for retaining the resin and fatty acid is undesirably reduced.

In the event it is not desired to resort to direct discharge of the contents of the digester into the separator, or other manners of application are involved wherein an opportunity might be presented for the resins to precipitate from the liquor, either by an unduly prolonged delay of the separation or other conditions, suitable heating provision should be made to assure the maintenance of the temperature of the waste liquor above the point of precipitation.

After the separation of the cellulose from the waste liquor, as described herein, it may then be washed in the well-known manner to remove the residual waste liquor therefrom. The term resins as used in the following claims is intended to embrace not only resins alone, but resins plus fatty acids and fatty acids alone.

I claim as my invention:

1. The method of reducing the content of resins and the like in cellulose produced by the sulphite digestion process which comprises, separating the cellulose from a major portion of the waste liquor contained in the cellulose-waste liquor mixture from the digestion before the temperature of the liquor has fallen to such an extent that the resins contained in the liquor are caused to precipitate appreciably.

2. The method of reducing the content of resins and the like in cellulose produced by the sulphite digestion process which comprises, separating the cellulose from a major portion of the waste liquor contained in the cellulose-waste liquor mixture from the digestion before the liquor has been diluted to such an extent that the resins contained in the liquor are caused to precipitate appreciably.

3. The method of reducing the content of resins and the like in cellulose produced by the sulphite digestion process which comprises, separating the cellulose from the major part of the waste liquor in the cellulose-waste liquor mixture from the digestion while the temperature of the liquor is above the point at which resins contained in the liquor are caused to precipitate appreciably.

4. The method of reducing the content of resins and the like in cellulose produced by the sulphite digestion process which comprises, separating the cellulose from the major part of the waste liquor in the cellulose-waste liquor mixture from the digestion practically immediately after discharge from the digester.

5. The method of reducing the content of resins and the like in cellulose produced by the sulphite digestion process which comprises, separating the cellulose from the major part of the waste liquor in the cellulose-waste liquor mixture from the digestion before the temperature of the liquor has fallen to such an extent that resins contained therein are caused to precipitate appreciably, and then washing the cellulose to render it substantially free of the remaining liquor.

In testimony whereof I affix my signature.
GUSTAF HAGLUND.